US012368236B2

(12) United States Patent
Ho et al.

(10) Patent No.: US 12,368,236 B2
(45) Date of Patent: Jul. 22, 2025

(54) ANTENNA SWITCHING CIRCUITRY SET AND ELECTRONIC DEVICE

(71) Applicant: Wistron NeWeb Corporation, Hsinchu (TW)

(72) Inventors: Wen Pin Ho, Hsinchu (TW); Chia-Hao Chang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 194 days.

(21) Appl. No.: 18/326,041

(22) Filed: May 31, 2023

(65) Prior Publication Data

US 2023/0395973 A1 Dec. 7, 2023

(30) Foreign Application Priority Data

Jun. 6, 2022 (TW) .................................. 111120878

(51) Int. Cl.
*H01Q 1/50* (2006.01)
*H01Q 1/48* (2006.01)

(52) U.S. Cl.
CPC ................. *H01Q 1/50* (2013.01); *H01Q 1/48* (2013.01)

(58) Field of Classification Search
CPC ............ H01Q 1/243; H01Q 1/48; H01Q 1/50; H01Q 5/328; H01Q 5/378; H01Q 9/42
See application file for complete search history.

(56) References Cited

U.S. PATENT DOCUMENTS 9,577,318 B2* 2/2017 Pascolini ............... H01Q 13/10
9,685,697 B2* 6/2017 Chen ....................... H01F 21/12
2012/0223773 A1* 9/2012 Jones .................... H03F 1/0227 330/124 R
2013/0229316 A1* 9/2013 Chen ...................... H01Q 5/378 343/729
2015/0022422 A1* 1/2015 Chang .................... H01Q 1/243 343/861
2015/0054697 A1* 2/2015 Chen ........................ H03H 7/38 343/745
2019/0372205 A1* 12/2019 Ruaro .................... H01Q 13/10
2021/0066799 A1* 3/2021 Avser ....................... H01Q 5/25
2024/0079786 A1* 3/2024 Wang ....................... H01Q 9/42

FOREIGN PATENT DOCUMENTS

TW 201505254 A 2/2015
TW 201517377 A 5/2015
TW 201611407 A 3/2016
TW 201717482 A 5/2017

* cited by examiner

*Primary Examiner* — Thien M Le
(74) *Attorney, Agent, or Firm* — McClure, Qualey & Rodack, LLP

(57) ABSTRACT

An antenna switching circuitry set includes an antenna, a switching circuitry, a specific function circuitry, and a first inductor. The antenna includes a first radiating element having a connection end and an open end. The switching circuitry is electrically connected to the connection end of the first radiating element through a first path. The specific function circuitry is electrically connected to the connection end of the first radiating element through a second path and is configured to provide a specific function. A specific function signal having a specific function frequency is transmitted between the first radiating element and the specific function circuitry. One end of the first inductor is connected in parallel with the first path, and the other end of the first inductor is connected to a ground.

18 Claims, 9 Drawing Sheets

ANTENNA SWITCHING CIRCUITRY SET AND ELECTRONIC DEVICE

RELATED APPLICATIONS

This application claims priority to Taiwan Application Serial Number 111120878, filed Jun. 6, 2022, which is herein incorporated by reference.

BACKGROUND

Technical Field

The present disclosure relates to an antenna switching circuitry set and an electronic device, and more particularly, to an antenna switching circuitry set and an electronic device that have a specific function circuitry.

Description of Related Art

As smaller in size and lighter in weight have become the developing trend of current electronic devices such as portable devices, circuitry design in the electronic device also faces stern challenges. Two circuitries sharing a circuitry design seems to be a solution for a thin and light electronic device, but the functions of the two circuitries may be affected due to interference between them or bad design, leading to false sensing or false acting, and therefore the electronic device with shared circuitry design has lower-level specification or the poor quality.

In view of this, an antenna switching circuitry set with improved functions of the two circuitries in a shared circuitry design that maintains or enhances the original functions and also meets the thin and light requirement of an electronic device is in need for the current circuitry design and the electronic device markets.

SUMMARY

One aspect of the present disclosure is to provide an antenna switching circuitry set, which includes an antenna, a switching circuitry, a specific function circuitry, and a first inductor. The antenna includes a first radiating element having a connection end and an open end. The switching circuitry is electrically connected to the connection end of the first radiating element through a first path. The specific function circuitry is electrically connected to the connection end of the first radiating element through a second path and is configured to provide a specific function, and a specific function signal having a specific function frequency is transmitted between the first radiating element and the specific function circuitry. One end of the first inductor is connected in parallel with the first path, and the other end of the first inductor is connected to a ground.

Another aspect of the present disclosure is to provide an antenna switching circuitry set, which includes a first radiating element, a specific function circuitry, a first inductor, a second inductor, and a first capacitor. The first radiating element includes a connection end, and the connection end is electrically connected to a first path. The specific function circuitry is electrically connected to the connection end of the first radiating element through a second path and is configured to provide a specific function, and a specific function signal having a specific function frequency is transmitted between the first radiating element and the specific function circuitry. One end of the first inductor is connected in parallel with the first path, and the other end of the first inductor is connected to a ground. The second inductor is connected in series to the second path. The first capacitor is connected in series between the connection end of the first radiating element and the one end of the first inductor in the first path.

Yet another aspect of the present disclosure is to provide an electronic device, which includes an antenna, a switching circuitry, a specific function circuit, a first inductor, a second inductor, and a first capacitor. The antenna includes a first radiating element having a connection end. The switching circuitry is electrically connected to the connection end of the first radiating element through a first path. The specific function circuitry is electrically connected to the connection end of the first radiating element through a second path and is configured to provide a specific function, and a specific function signal having a specific function frequency is transmitted between the first radiating element and the specific function circuitry. One end of the first inductor is connected in parallel with the first path, and the other end of the first inductor is connected to a ground. The second inductor is connected in series to the second path. The first capacitor is connected in series between the connection end of the first radiating element and the one end of the first inductor in the first path.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
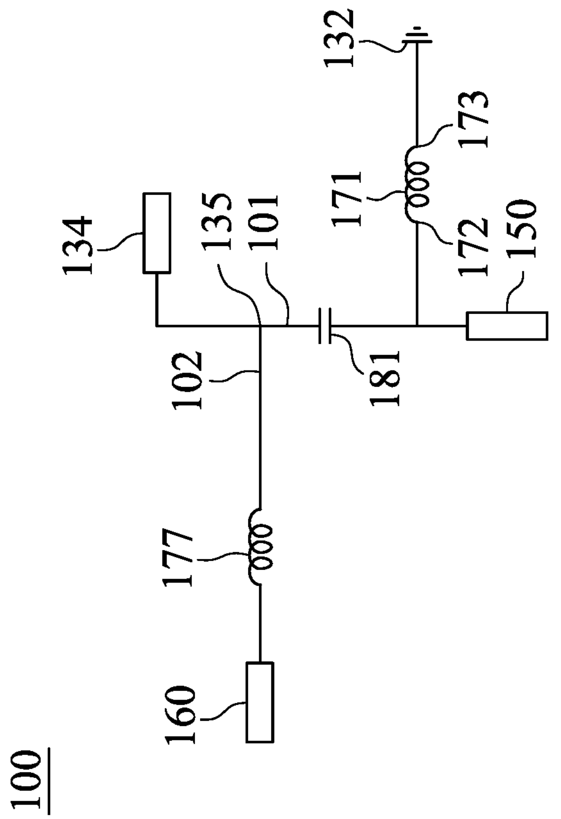
FIG. 1 is a schematic view of an antenna switching circuitry set according to a first embodiment of the present disclosure.

FIG. 1 is a schematic view of an antenna switching circuitry set 100 according to a first embodiment of the present disclosure. Referring to FIG. 1, the antenna switching circuitry set 100 includes a first radiating element 134, a specific function circuitry 160, and a first inductor 171. The first radiating element 134 includes a connection end 135, and the connection end 135 is electrically connected to a first path 101. The specific function circuitry 160 is electrically connected to the connection end 135 of the first radiating element 134 via (through) a second path 102 and is configured to provide a specific function. A specific function signal with (having) a specific function frequency is transmitted between the first radiating element 134 and the specific function circuitry 160. One end 172 of the first inductor 171 is connected in parallel with, i.e., in shunt with, the first path 101, and one end 173 of the first inductor 171 is connected to a ground 132. It is to be noted that the inductor and the capacitor as described in the present disclosure can also be referring to an inductor element and a capacitor element, or an inductor module or a capacitor module, each of the inductor and the capacitor includes one passive element or a combination of multiple passive elements connected in series or parallel, and the equivalent characteristics thereof are respectively the inductance and the capacitance.

The antenna switching circuitry set 100 may further include a second inductor 177 and a first capacitor 181. The second inductor 177 is connected in series to the second path 102. The specific function circuitry 160 is indirectly electrically connected to the connection end 135 of the first radiating element 134. The first capacitor 181 is connected in series between the connection end 135 of the first radiating element 134 and the end 172 of the first inductor 171 in the first path 101. Therefore, the arrangement as such assists to stabilize the sensing function of the specific function circuitry 160 which functions through the first radiating element 134.

Figure 2:
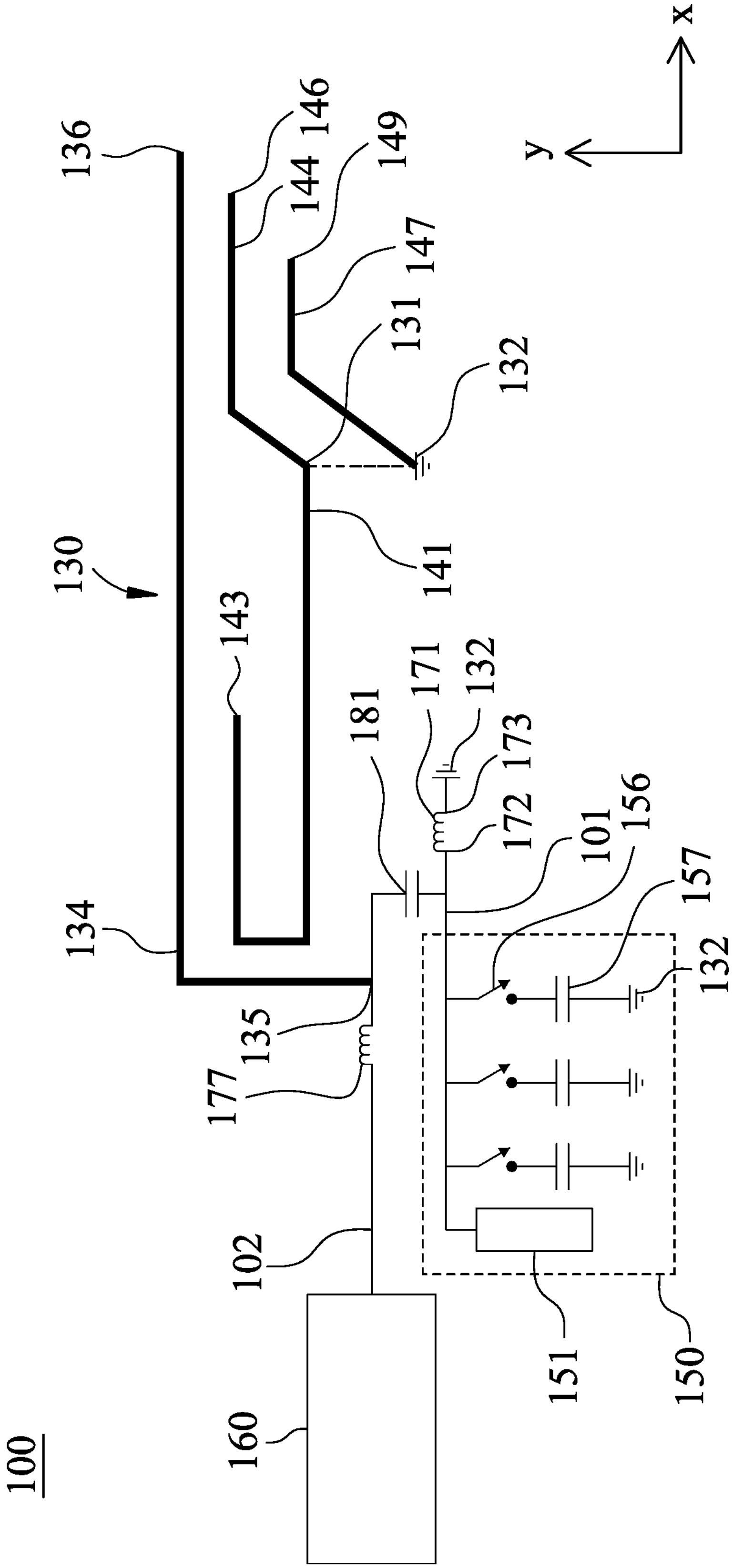
FIG. 2 is another schematic view of the antenna switching circuitry set according to the first embodiment of the present disclosure.

FIG. 2 is another schematic view of the antenna switching circuitry set 100 according to the first embodiment of the present disclosure. Referring to FIG. 1 and FIG. 2, the antenna switching circuitry set 100 may further include an antenna 130 and a switching circuitry 150. The antenna 130 includes the first radiating element 134, and the first radiating element 134 includes the connection end 135 and an open end 136. The switching circuitry 150 is electrically connected to the connection end 135 of the first radiating element 134 via the first path 101, and the switching circuitry 150 is indirectly electrically connected to the connection end 135 of the first radiating element 134. Thus, the antenna switching circuitry set 100 includes a tunable circuitry combination of the pattern of the first radiating element 134, the specific function circuitry 160, and the switching circuitry 150, and through the arrangement of the first inductor 171 in the circuitry, the sensing function of the specific function circuitry 160 is stabilized while the first radiating element 134 changes frequencies.

Figure 3:
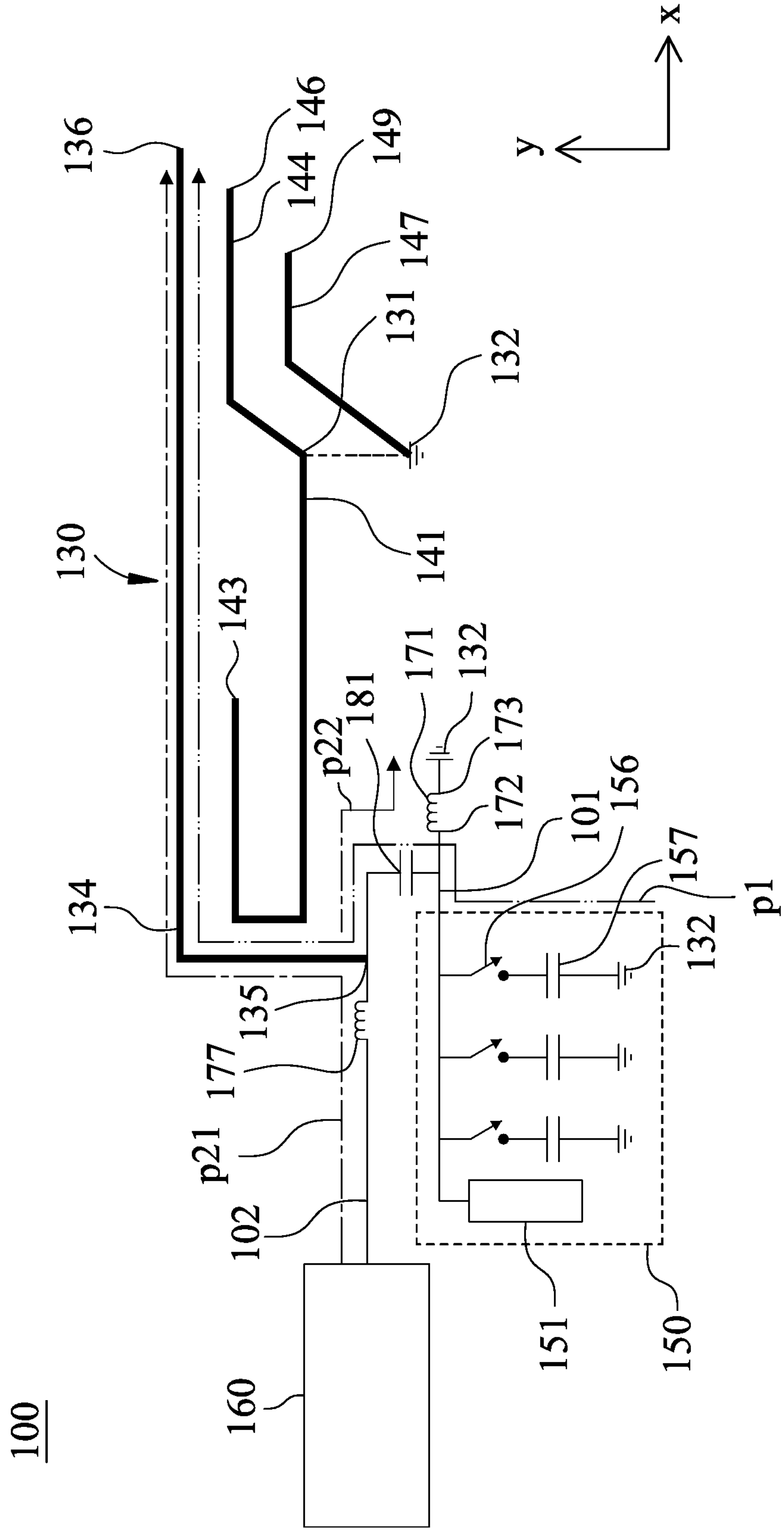
FIG. 3 is a schematic view illustrating signal paths of the antenna switching circuitry set according to the first embodiment of the present disclosure.
Figure 4:
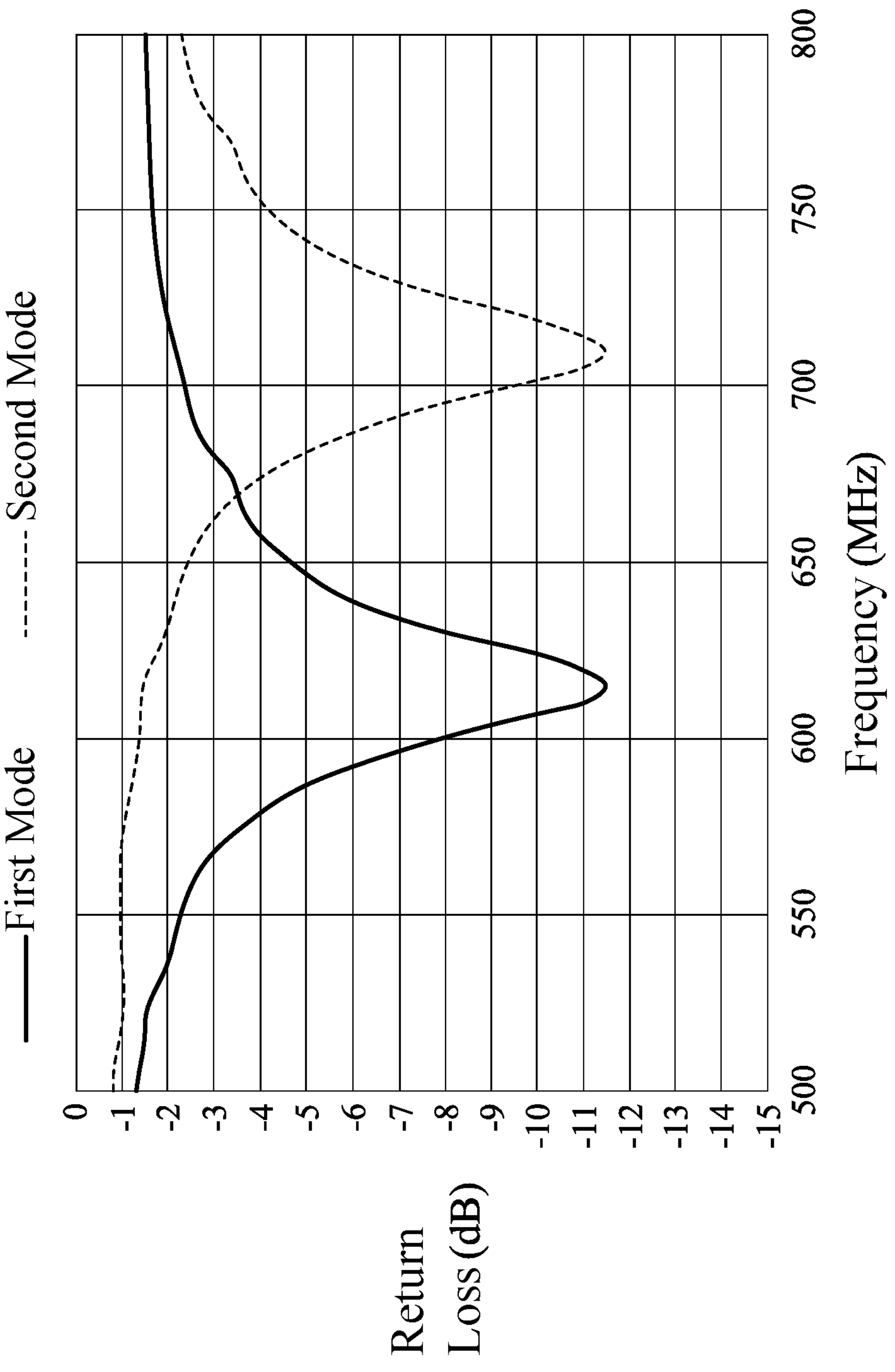
FIG. 4 is a schematic chart illustrating a first radiating element in different modes of the antenna switching circuitry set according to the first embodiment of the present disclosure.

FIG. 3 is a schematic view illustrating signal paths of the antenna switching circuitry set 100 according to the first embodiment of the present disclosure, and FIG. 4 is a schematic chart illustrating the first radiating element 134 in different modes of the antenna switching circuitry set 100 according to the first embodiment of the present disclosure. Referring to FIG. 3 and FIG. 4, in detail, at least two first communication transceiving signals p1 may respectively correspond to at least two first communication transceiving frequencies, which respectively correspond to the first mode and the second mode in FIG. 4. The switching circuitry 150 is configured to switch one of the first communication transceiving frequencies that is used (applied) by the first radiating element 134 to the other of the first communication transceiving frequencies, so that each first communication transceiving signal p1 is transmitted between the first radiating element 134 and the switching circuitry 150 by switching. In other words, the switching circuitry 150 is configured to switch the first radiating element 134 from operating at one of the first communication transceiving frequencies to operating at the other of the first communication transceiving frequencies so as to transmit each of the first communication transceiving signals p1 by switching. Furthermore, the specific function frequency is different from each of the first communication transceiving frequencies. Hence, the frame structure of the antenna switching circuitry set 100 is good for the design of separate transmission paths for signals with different frequencies.

The switching circuitry 150 may include a switch control unit 151, a plurality of switches 156, and a plurality of second capacitors 157. The switch control unit 151 is configured to control, through the switches 156, whether one of the second capacitors 157 is connected in parallel with the first path 101. One end of each switch 156 is connected in parallel with the first path 101, and another end of each switch 156 is connected to the ground 132 through the corresponding second capacitor 157.

The switching circuitry 150 may have a plurality of switch modes, and in each switch mode, the switching circuitry 150 enables the first radiating element 134 to operate at one of the first communication transceiving frequencies. Therefore, through the change in the capacitances of the second capacitors 157 resulted from if being connected in parallel with the first path 101, the first communication transceiving frequency which the first radiating element 134 operates at is changed.

Each of the first communication transceiving frequencies of the first radiating element 134 may be between 10 MHz and 10 GHz (in a range of 10 MHz to 10 GHz, including the end points 10 MHz and 10 GHz, and applicable to the same reciting manners in the following contents), and the specific function frequency of the specific function circuitry 160 is between 1 kHz and 1 MHz, so that the first radiating element 134 can further be implemented in Band 71 (617 MHz~698 MHz) covered by the 5th generation mobile networks (5G) and be designed as transmitting paths for signals with different frequencies.

A first inductance of the first inductor 171 may be between 1 nH and 1 μH, and preferably between 1 nH and 400 nH. The specific function signal p22 in FIG. 3 is therefore directed to the ground 132 through the first inductor 171 to maintain the functions of the switching circuitry 150 and the specific function circuitry 160 at the same time. In addition, the first inductance of the first inductor 171 may be 120 nH, and the first inductance of the first inductor 171 and the second inductance of the second inductor 177 may be the same.

The second inductance of the second inductor 177 may be between 1 nH and 1 μH, preferably between 1 nH and 400 nH, which in turn helps to maintain the function of the specific function circuitry 160 in the shared circuitry design framework.

The first capacitance of the first capacitor 181 may be between 1 pF and 500 pF (may range from 1 pF to 500 pF), preferably between 5 pF and 200 pF, which in turn helps to maintain the functions of the switching circuitry 150 and the specific function circuitry 160 in the shared circuitry design framework. Further, the first capacitance of the first capacitor 181 may be 56 pF.

The specific function circuitry 160 may be a proximity sensing circuitry. Thus, the switching circuitry 150, which acts as a tuning circuitry, changes and switches the frequency by whether the plurality of second capacitors 157 are respectively connected in parallel with the first path 101, and the specific function circuitry 160 of the proximity sensing circuitry detects human distance based on the variation of the environmental capacitance. When the specific function circuitry 160 and the switching circuitry 150 both use or share the first radiating element 134, the antenna switching circuitry set 100 of the first embodiment effectively is advantageous in reducing the occurrence of erroneous detection in proximity sensing.

Figure 5:
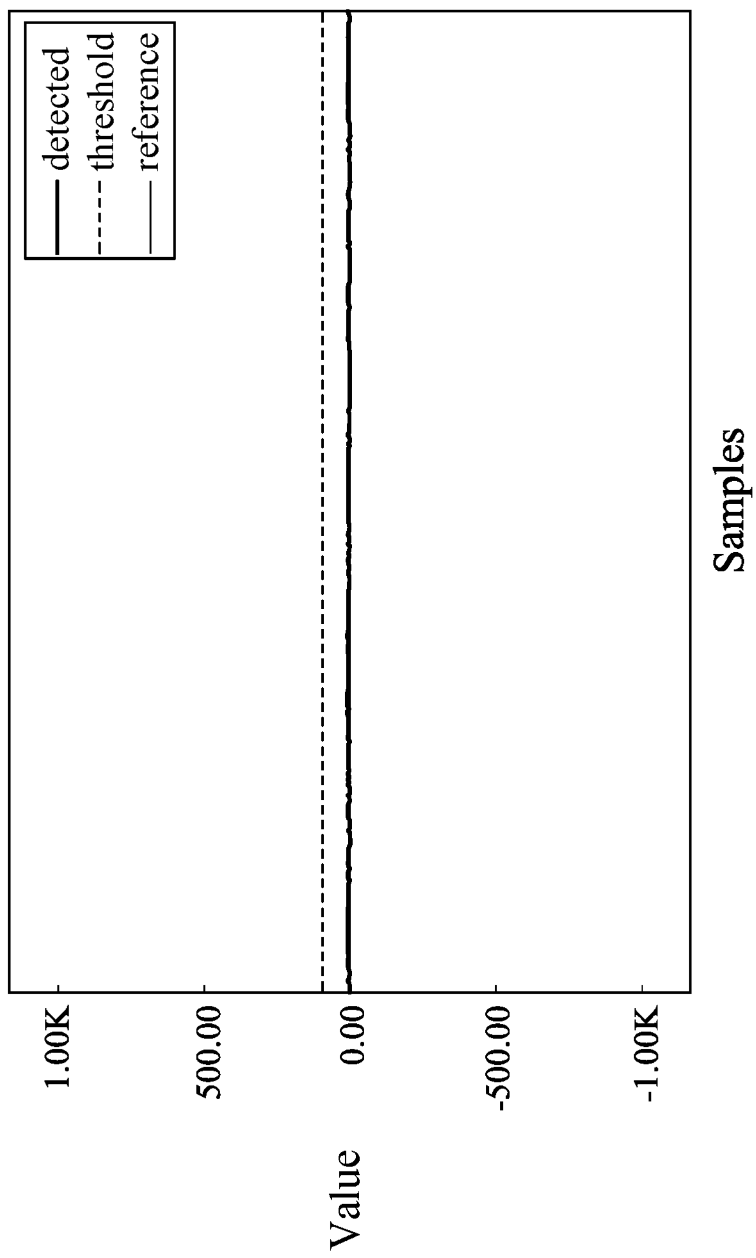
FIG. 5 is a schematic chart illustrating sensing of a specific function circuitry in the antenna switching circuitry set according to the first embodiment of the present disclosure.
Figure 6:
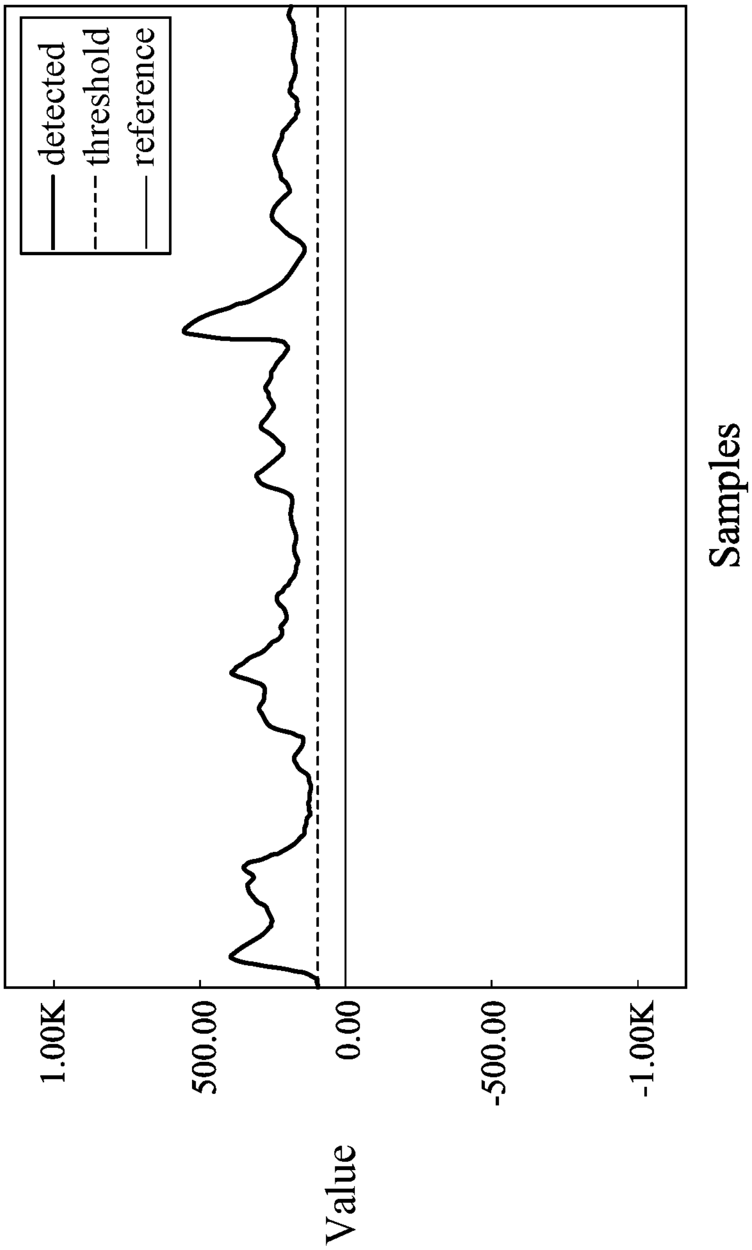
FIG. 6 (Prior Art)
FIG. 6 is a schematic chart illustrating sensing of a specific function circuitry in a conventional antenna switching circuitry set.
Figure 7:
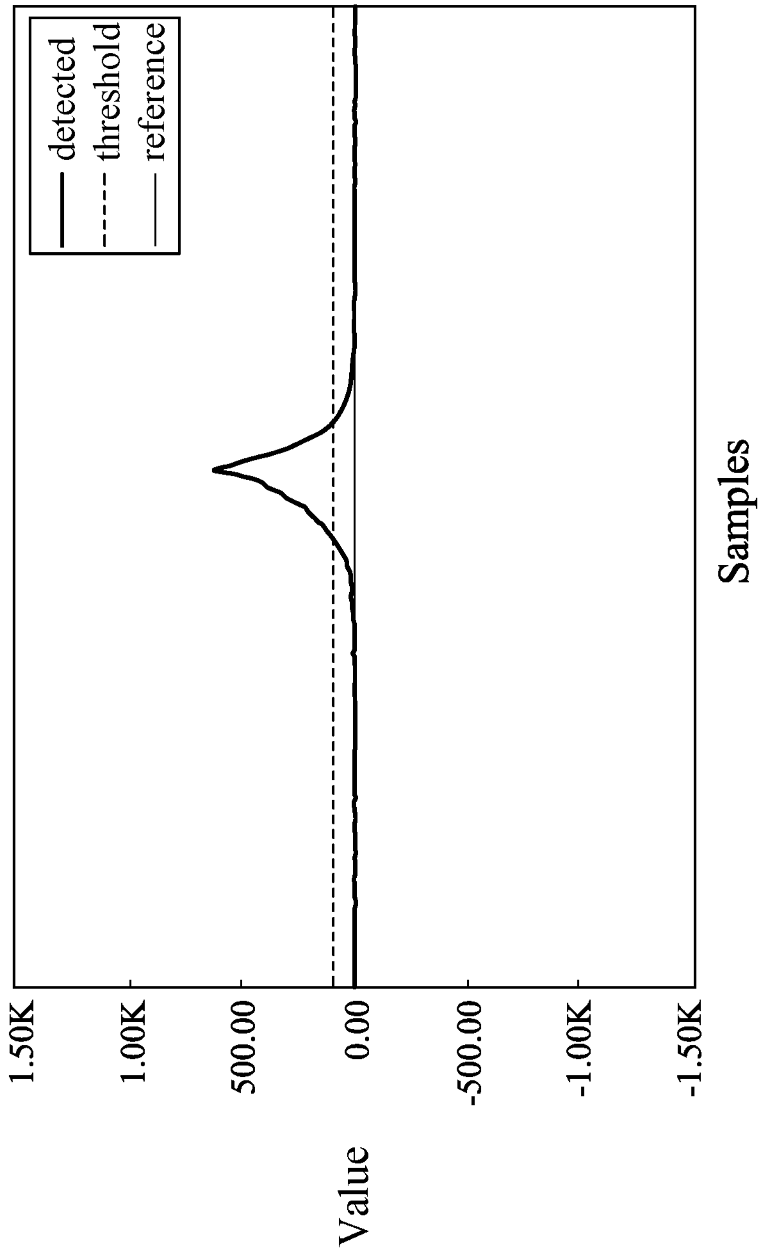
FIG. 7 is another schematic chart illustrating sensing of the specific function circuitry in the antenna switching circuitry set according to the first embodiment of the present disclosure.

FIG. 5 is a schematic chart illustrating sensing of the specific function circuitry 160 in the antenna switching circuitry set 100 according to the first embodiment of the present disclosure, FIG. 6 is a schematic chart illustrating sensing of a specific function circuitry (e.g., a proximity sensing circuitry) in a conventional antenna switching circuitry set, and FIG. 7 is another schematic chart illustrating sensing of the specific function circuitry 160 in the antenna switching circuitry set 100 according to the first embodiment of the present disclosure. FIG. 5, FIG. 6, and FIG. 7 are time-domain-sampling charts. Referring to FIG. 5, it corresponds that the first radiating element 134 and the switching circuitry 150 of the antenna switching circuitry set 100 are in the steady state in the first mode or the second mode shown in FIG. 4, and there is no proximity event around the antenna switching circuitry set 100, so that the sensing value is substantially equal to a reference value and smaller than a threshold value. Referring to FIG. 6, it corresponds that the conventional antenna switching circuitry set is in the transient state of switching between the first mode and the second mode, and although there is no proximity event around, the switching between the first mode and the second mode causes several sensing values of the proximity sensing circuitry to be greater than the threshold value, thereby leading to erroneous triggering and mis-judgement that a proximity event has occurred and been detected. Referring to FIG. 7, it corresponds that the first radiating element 134 and the switching circuitry 150 of the antenna switching circuitry set 100 are in the transient state of switching between the first mode and the second mode while a proximity event occurred around the antenna switching circuitry set 100, and the sensing values of one continuous waveform are greater than the threshold value, which indicates that the antenna switching circuitry set 100 can reduce the phenomenon of unstable proximity sensing signals due to the change in the overall capacitance of the second capacitors 157 of the switching circuitry 150. The erroneous triggering is therefore prevented, and especially, the antenna switching circuitry set 100 with the first inductor 171 can correctly determine and detect the occurrence of proximity events without being affected by the transient state of switching between modes.

Referring to FIG. 3, the first communication transceiving signals p1 with different first communication transceiving frequencies are transmitted between the first radiating element 134 and the switching circuitry 150, and the specific function signal p21 with the specific function frequency is transmitted between the first radiating element 134 and the specific function circuitry 160. The conventional antenna switching circuitry set has the specific function signal transmitted between the first radiating element and the switching circuitry, and so the specific function circuitry is easy to make wrong judgements. On the contrary, the antenna switching circuitry set 100 makes the first capacitor 181, which acts as a reference capacitor for the specific function circuitry 160, to change the passing path, such as directing the specific function signal p22 to the ground 132 through the first inductor 171, and therefore the first capacitance of the first capacitor 181 maintains stable and does not vary with the overall capacitance of the second capacitors 157 of the switching circuitry 150. Hence, the function of the specific function circuitry 160 is stabilized while the switching circuitry 150 changes frequency.

Referring to FIG. 2, the antenna 130 may further include a feed port 131 and second radiating elements 141, 144. One end of each of the second radiating elements 141, 144 is electrically connected to the feed port 131, and another ends of the second radiating elements 141, 144 are respectively open ends 143, 146. The first radiating element 134 is coupled to and not physically connected to the second radiating elements 141, 144, and the second radiating elements 141, 144 operate at second communication transceiving frequencies that are higher than each of the first communication transceiving frequencies. As such, besides operating at the first communication frequencies by coupling with the second radiating elements 141, 144, the first radiating element 134 also acts as a sensing element for the specific function circuitry 160. In specific, each of the first radiating element 134 and the second radiating elements 141, 144 has a length extending along a first direction x greater than a length extending along a second direction y, and the first direction x is orthogonal to the second direction y. The total length of the first radiating element 134 is greater than the total length of each of the second radiating elements 141, 144, and the second radiating elements 141, 144 extend from the feed port 131 to two ends, respectively, of the first direction x as shown in FIG. 2 and FIG. 3.

The antenna 130 may further include an open stub 147, and the open stub 147 includes a connection end and an open end 149. The connection end of the open stub 147 is connected to the ground 132 and is adjacent to the feed port 131, thereby enhancing the excitation of the second radiating elements 141, 144 for further coupling with the first radiating element 134.

Figure 8:
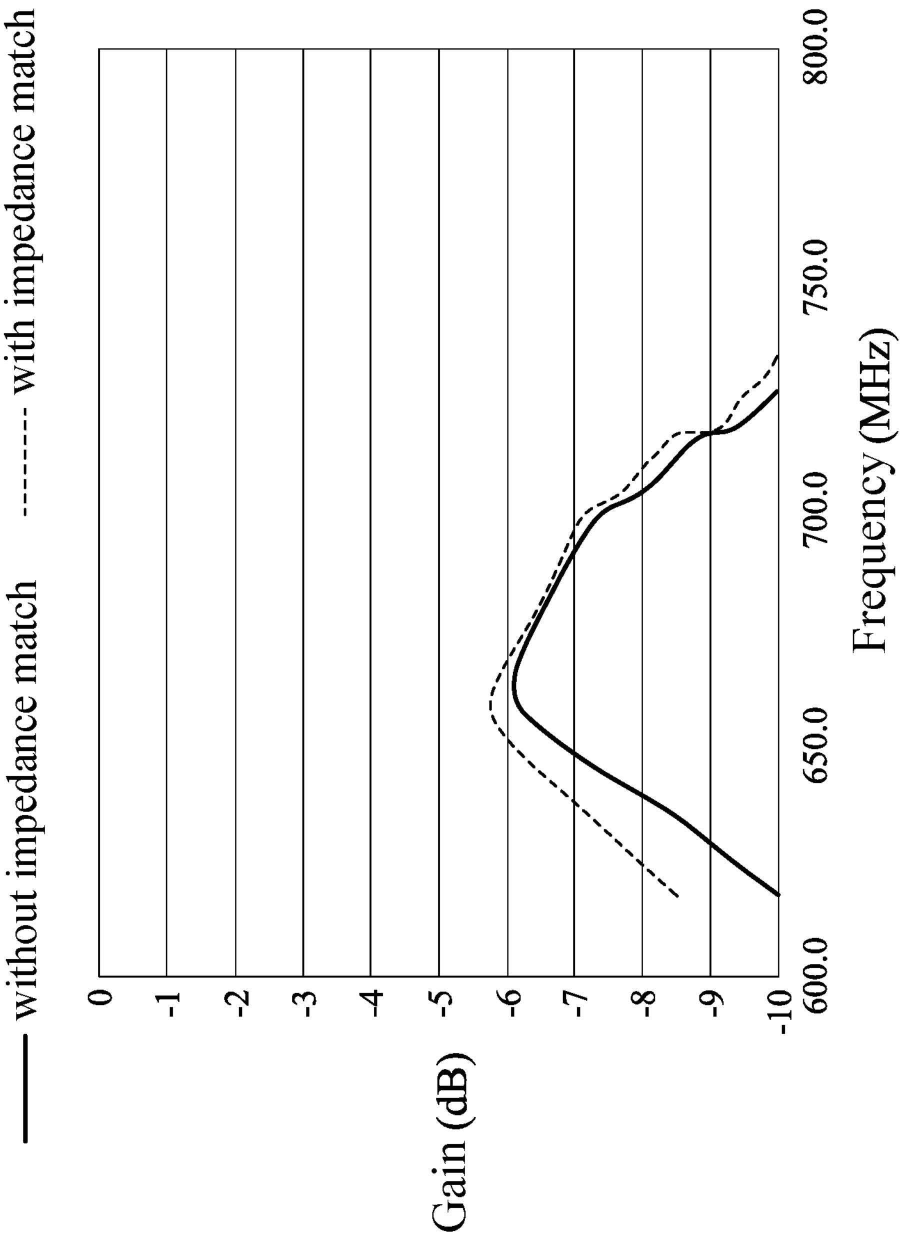
FIG. 8 is a schematic chart illustrating the antenna gain of the first radiating element of the antenna switching circuitry set according to the first embodiment of the present disclosure.

FIG. 8 is a schematic chart illustrating the antenna gain of the first radiating element 134 of the antenna switching circuitry set 100 according to the first embodiment of the present disclosure. Referring to FIG. 8, when the first inductance of the first inductor 171 and the second inductance of the second inductor 177 are both 120 nH and the first capacitance of the first capacitor 181 is 56 pF, the impedance matching in frequency range of 0.6 GHz to 8 GHz in the Smith chart may be near 50 ohm, which achieves the impedance matching of the first radiating element 134 with reduced loss to obtain better antenna performance.

Figure 9:
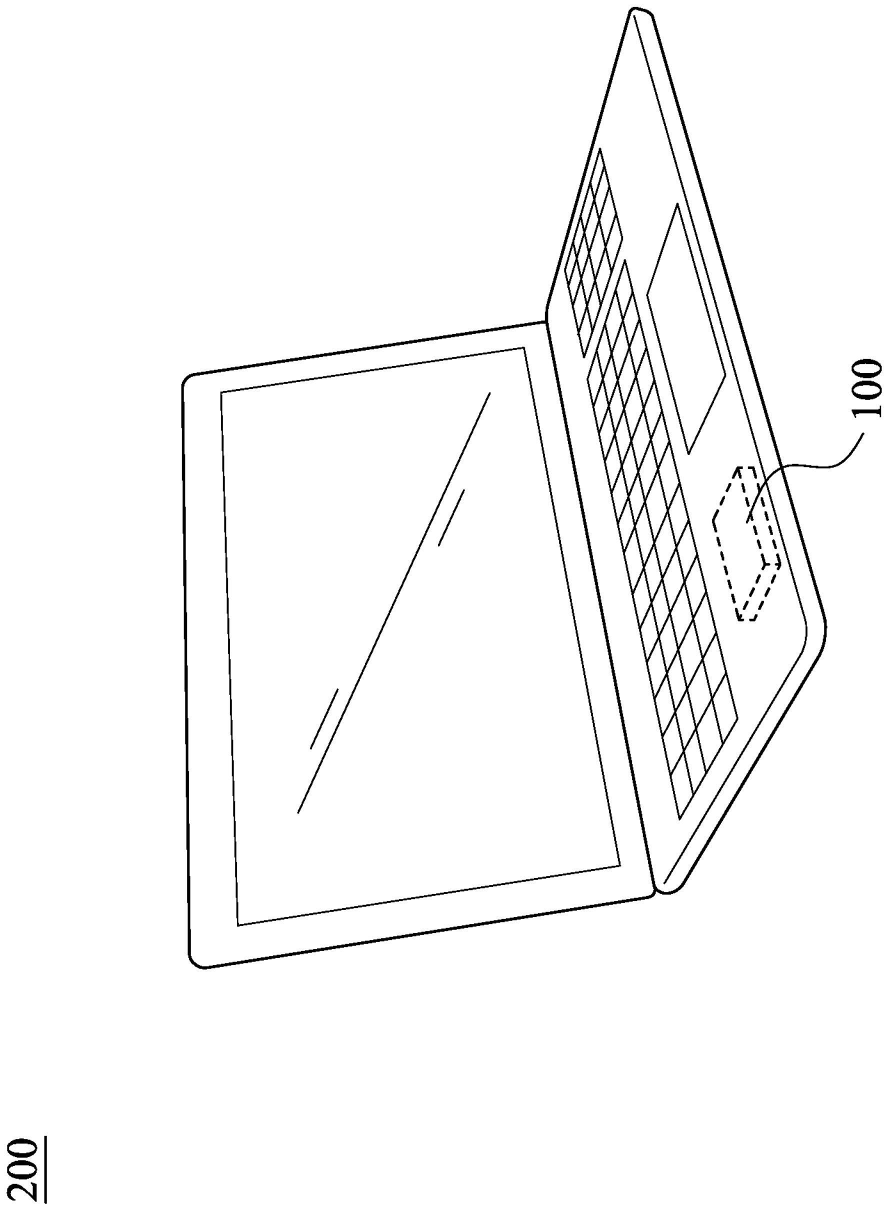
FIG. 9 is a schematic view of an electronic device according to a second embodiment of the present disclosure.

FIG. 9 is a schematic view of an electronic device 200 according to a second embodiment of the present disclosure. Referring to FIG. 2 and FIG. 9, the electronic device 200 of the second embodiment can be specifically a laptop computer, but the present disclosure is not limited thereby, and includes the antenna switching circuitry set 100 of the first embodiment. In other words, the electronic device 200 includes the antenna 130, the switching circuitry 150, the specific function circuitry 160, the first inductor 171, the second inductor 177, and the first capacitor 181. The antenna 130 includes the first radiating element 134, and the first radiating element 134 includes the connection end 135. The switching circuitry 150 is electrically connected to the connection end 135 of the first radiating element 134 via the first path 101. The specific function circuitry 160 is electrically connected to the connection end 135 of the first radiating element 134 via the second path 102 and is configured to provide a specific function. A specific function signal with a specific function frequency is transmitted between the first radiating element 134 and the specific function circuitry 160. The end 172 of the first inductor 171 is connected in parallel with the first path 101, and the end 173 of the first inductor 171 is connected to the ground 132. The second inductor 177 is connected in series to the second path 102. The first capacitor 181 is connected in series between the connection end 135 of the first radiating element 134 and the end 172 of the first inductor 171 in the first path 101. Since small-size and light-weight are becoming the developing trend for current electronic devices and portable devices, such as notebook computers, the trend of display design is toward narrow frame bezel, and so the antenna location is trending toward moving to the keyboard side, which means the distance between antenna and human is closer with increased risk of exceedingly high specific absorption rate (SAR). Furthermore, with the advancement of wireless communication technology, the required transmission bandwidth is wider, like Band 71 (617 MHz~698 MHz) which is covered by 5G, and larger space is needed for design, but space is usually limited. The electronic device 200 of the second embodiment uses the frequency-tunable and sensible antenna design to solve the limited-space issue and also uses the specific function circuitry 160 of the proximity sensing circuitry to solve the exceeding SAR issue.

Other details of the electronic device 200 of the second embodiment are similar to the antenna switching circuitry set 100 of the first embodiment, and so are not described herein.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An antenna switching circuitry set, comprising:

an antenna, comprising a first radiating element having a connection end and an open end;

a switching circuitry, electrically connected to the connection end of the first radiating element through a first path;

a specific function circuitry, electrically connected to the connection end of the first radiating element through a second path and configured to provide a specific function, wherein the specific function circuitry is a proximity sensing circuitry, and a specific function signal having a specific function frequency is transmitted between the first radiating element and the specific function circuitry; and a first inductor, wherein one end of the first inductor is connected in parallel with the first path, and the other end of the first inductor is connected to a ground.

2. The antenna switching circuitry set of claim 1, wherein a first inductance of the first inductor is between 1 nH and 1 μH.

3. The antenna switching circuitry set of claim 1, further comprising:

a second inductor, connected in series to the second path, wherein a second inductance of the second inductor is between 1 nH and 1 μH.

4. The antenna switching circuitry set of claim 1, further comprising:

a first capacitor, connected in series between the connection end of the first radiating element and the one end of the first inductor in the first path, wherein a first capacitance of the first capacitor is between 1 pF and 500 pF.

5. The antenna switching circuitry set of claim 1, wherein at least two first communication transceiving signals correspond respectively to at least two first communication transceiving frequencies, the switching circuitry is configured to switch the first radiating element from operating at one of the at least two first communication transceiving frequencies to the other of the at least two first communication transceiving frequencies, so that each of the at least two first communication transceiving signals is transmitted between the first radiating element and the switching circuitry by switching, and the specific function frequency is different from each of the at least two first communication transceiving frequencies.

6. The antenna switching circuitry set of claim 5, wherein the switching circuitry comprises a plurality of switches and a plurality of second capacitors, one end of each of the plurality of switches is connected in parallel with the first path, and another end of each of the plurality of switches is connected to the ground through a corresponding one of the plurality of second capacitors.

7. The antenna switching circuitry set of claim 6, wherein the switching circuitry has a plurality of switch modes, and the switching circuitry enables the first radiating element to operate at one of the at least two first communication transceiving frequencies in each of the plurality of switch modes.

8. The antenna switching circuitry set of claim 5, wherein each of the at least two first communication transceiving frequencies is between 10 MHz and 10 GHz, and the specific function frequency is between 1 kHz and 1 MHz.

9. The antenna switching circuitry set of claim 5, wherein the antenna further comprises a feed port and at least one second radiating element, one end of the second radiating element is electrically connected to the feed port, the first radiating element is coupled to the second radiating element, the second radiating element operates at a second communication transceiving frequency, and the second communication transceiving frequency is higher than each of the at least two first communication transceiving frequencies.

10. The antenna switching circuitry set of claim 9, wherein the antenna further comprises an open stub, the open stub comprises a connection end and an open end, and the connection end of the open stub is connected to the ground and is adjacent to the feed port.

11. An antenna switching circuitry set, comprising:

a first radiating element, comprising a connection end, wherein the connection end is electrically connected to a first path;

a specific function circuitry, electrically connected to the connection end of the first radiating element through a second path and configured to provide a specific function, wherein a specific function signal having a specific function frequency is transmitted between the first radiating element and the specific function circuitry;

a first inductor, wherein one end of the first inductor is connected in parallel with the first path, and the other end of the first inductor is connected to a ground;

a second inductor, connected in series to the second path; and a first capacitor, connected in series between the connection end of the first radiating element and the one end of the first inductor in the first path.

12. The antenna switching circuitry set of claim 11, wherein a first inductance of the first inductor is 120 nH.

13. The antenna switching circuitry set of claim 11, wherein a first capacitance of the first capacitor is 56 pF.

14. An electronic device, comprising:

an antenna, comprising a first radiating element having a connection end;

a switching circuitry, electrically connected to the connection end of the first radiating element through a first path;

a specific function circuitry, electrically connected to the connection end of the first radiating element through a second path and configured to provide a specific function, wherein a specific function signal having a specific function frequency is transmitted between the first radiating element and the specific function circuitry;

a first inductor, wherein one end of the first inductor is connected in parallel with the first path, and the other end of the first inductor is connected to a ground;

a second inductor, connected in series to the second path; and a first capacitor, connected in series between the connection end of the first radiating element and the one end of the first inductor in the first path.

15. The electronic device of claim 14, wherein a first inductance of the first inductor is same as a second inductance of the second inductor.

16. The electronic device of claim 14, wherein at least two first communication transceiving signals correspond respectively to at least two first communication transceiving frequencies, the switching circuitry is configured to switch the first radiating element from operating at one of the at least two first communication transceiving frequencies to the other of the at least two first communication transceiving frequencies so that each of the at least two first communication transceiving signals is transmitted between the first radiating element and the switching circuitry by switching, and the specific function frequency is different from each of at least two first communication transceiving frequencies.

17. The electronic device of claim 16, wherein the switching circuitry comprises a plurality of switches and a plurality of second capacitors, one end of each of the plurality of switches is connected in parallel with the first path, another end of each of the plurality of switches is connected to the ground through a corresponding one of the plurality of second capacitors, the switching circuitry has a plurality of switch modes, and the switching circuitry enables the first radiating element to operate at one of the at least two first communication transceiving frequencies in each of the plurality of switch modes.

18. The electronic device of claim 16, wherein each of the at least two first communication transceiving frequencies is between 10 MHz and 10 GHz, and the specific function frequency is between 1 kHz and 1 MHz.

* * * * *